United States Patent [19]

Williames

[11] Patent Number: 4,723,400

[45] Date of Patent: Feb. 9, 1988

[54] PYRETHRUM HARVESTING MACHINES

[75] Inventor: Geoffrey A. Williames, Warragul, Australia

[73] Assignee: Geoff. Williames (Aust.) Pty Ltd., Warragul, Australia

[21] Appl. No.: 852,128

[22] Filed: Apr. 15, 1986

Related U.S. Application Data

[60] Division of Ser. No. 740,230, Jun. 1, 1985, which is a continuation of Ser. No. 495,765, May 18, 1983.

[30] Foreign Application Priority Data

May 18, 1982 [AU] Australia ............................... PF4066
Feb. 7, 1983 [AU] Australia ............................ 11209/83

[51] Int. Cl.4 ............................................ A01D 45/00
[52] U.S. Cl. ........................................ 56/130; 56/13.1
[58] Field of Search ................ 56/130, 30, 12.9, 13.1, 56/13.2, 13.3, 126

[56] References Cited

U.S. PATENT DOCUMENTS

| | | | |
|---|---|---|---|
| 1,343,884 | 6/1920 | Hamilton | 56/130 |
| 1,370,919 | 3/1921 | Schaeffer | 56/130 |
| 2,387,004 | 10/1945 | Berry | 56/30 |
| 2,460,029 | 1/1949 | Ramp | 56/13.2 |
| 2,961,819 | 11/1960 | Edwards, Jr, | 56/30 |
| 3,245,211 | 4/1966 | Weygandt et al. | 56/130 |
| 3,797,216 | 3/1974 | Resetich | 56/364 |
| 3,892,061 | 7/1975 | Whitley | 56/126 |
| 4,373,322 | 2/1983 | Beisel | 56/13.3 |

FOREIGN PATENT DOCUMENTS 21334  5/1930  Australia ............................ 56/12.9

*Primary Examiner*—Paul J. Hirsch
*Attorney, Agent, or Firm*—Learman & McCulloch

[57] ABSTRACT

Apparatus for harvesting mature pyrethrum flowers comprises a mobile chassis movable through a field of growing flowers and having a pair of drums rotatable in opposite directions about vertically spaced axes. Each of the drums has a plurality of longitudinally extending, radially projecting, circumferentially spaced flutes which confront one another momentarily during rotation of the drums. The vertical spacing between the axes of the drum is such that there exists a space between confronting flutes that is too great to sever an immature flower from its stem, but is sufficiently small to sever a mature flower from its stem. An air duct communicating with a fan receives severed flowers and conducts them to a storage bin.

11 Claims, 5 Drawing Figures

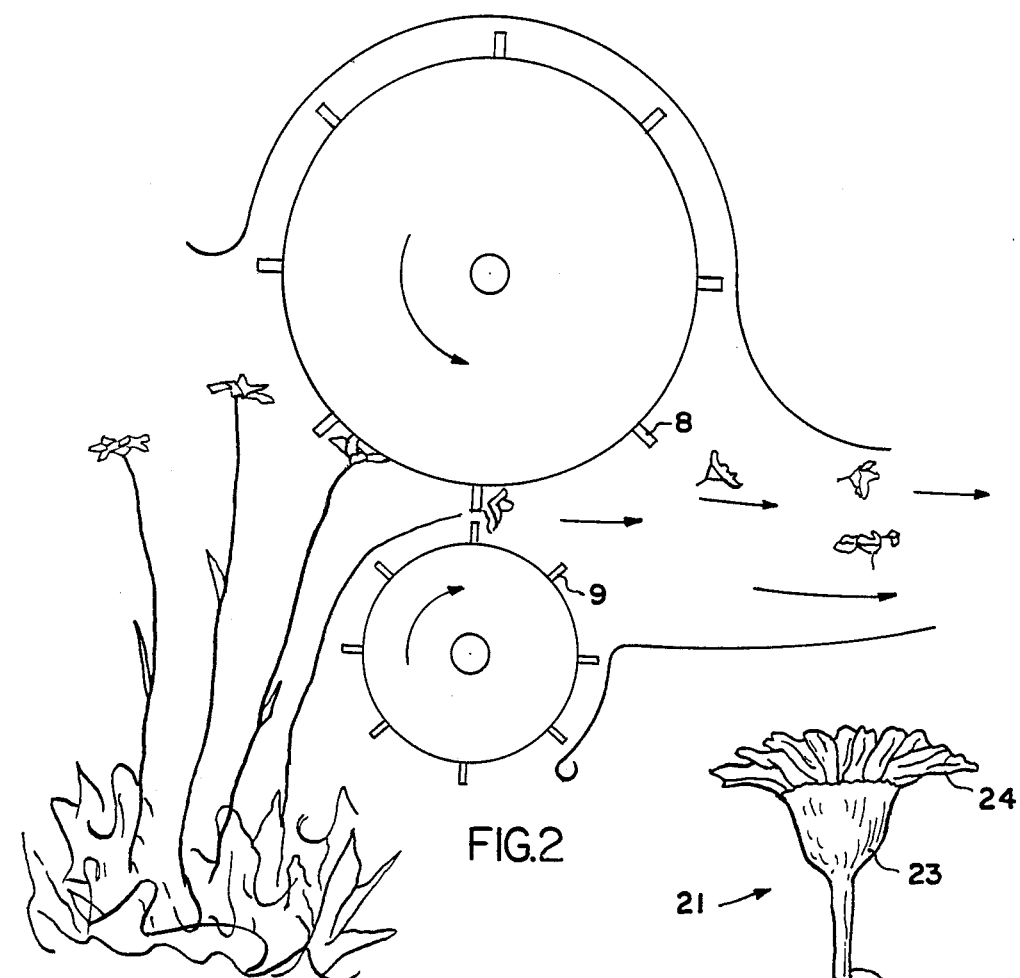
FIG.2
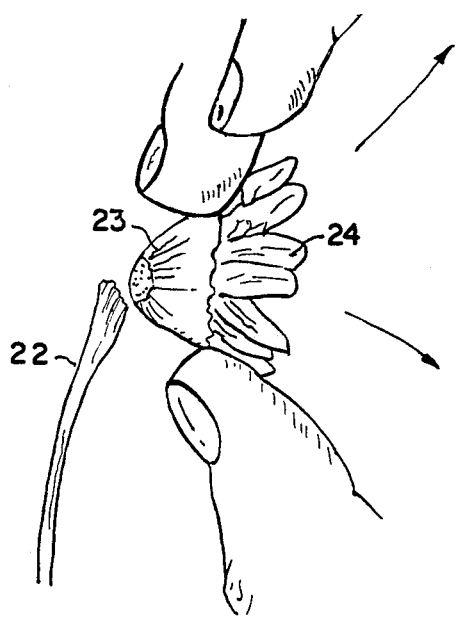
FIG.4
FIG.3
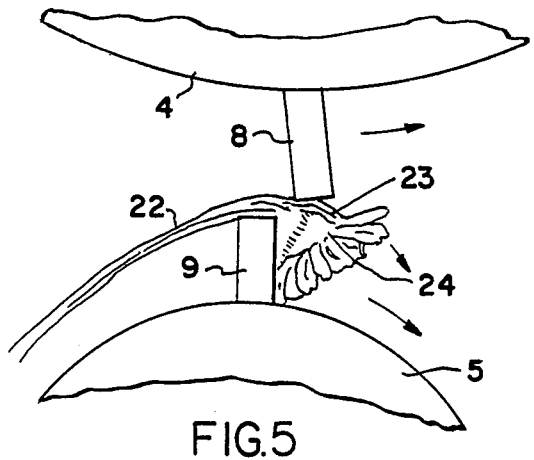
FIG.5

PYRETHRUM HARVESTING MACHINES

This is a divisional of co-pending application Ser. No. 740,230, filed on June 1, 1985, which is a continuation application of Ser. No. 495,765, filed on May 18, 1983.

BACKGROUND OF THE INVENTION

This invention relates to machines for harvesting pyrethrum flowers. Pyrethrum is one of the oldest and best known plant insecticides and has been used for many years for controlling household insects, such as flies, and for controlling pests on agricultural crops. The fact that pyrethrum is harmless to man and animals has made it particularly desirable for household use and on food crops.

The range of usefulness of the insecticide has been achieved by the extraction of pyrethrins from the flowers of the pyrethrum plant. These extracts in suitable form are widely used as sprays for the control of insects in households, greenhouses, and gardens.

The pyrethrum flowers must be harvested during a relatively short time because they rapidly reach and pass the preferred stage of maturity for picking. Furthermore, the plants are not strong and are prone to lean or fall to the ground in unfavorable condition for picking. These factors have made it difficult to harvest the pyrethrum flower mechanically.

A principal object of the invention is to provide a harvesting machine capable of harvesting pyrethrum flowers substantially at maturity with little or no damage to the plant and with minimal wastage, while leaving buds and immature flowers in condition for further growth and development.

SUMMARY OF THE INVENTION

A harvesting machine constructed in accordance with the present invention comprises a picking head mounted on a movable chassis for contacting a crop to be harvested, the picking head including a pair of rotary drums for engaging and picking mature pyrethrum flowers.

Conveniently, the picking head comprises a pair of drums rotatable in opposite directions about vertically spaced axes, each of the drums having axially elongated, radially extending flutes which confront one another momentarily during rotation of the drums and which are spaced apart a distance that is sufficient to effect severing of mature flowers from their stems, but too great to affect immature flowers.

It is a characteristic of a pyrethrum flower for the base or bowl of the flower to grow larger and become firmer as the flower matures. According to the invention the picking head engages the bowl of mature flowers to harvest them, but permits smaller, immature flowers to remain attached to their stems, thereby enabling the buds and smaller flowers to be left on the plant until they mature.

The harvester picking head preferably includes a vacuum duct system fitted to a high clearance tractor chassis to enable the straddling of pyrethrum beds and the conveyance of the picked flowers to a bulk collector bin suitably designed to discharge into a bulk storage bin.

Such a harvesting machine is easily controlled by the operator to harvest selectively picked flowers and provides temporary storage means for the harvested crop.

According to the present invention a harvesting machine particularly for harvesting pyrethrum flowers comprises a mobile chassis, an adjustable height picking head attachment for accurate positioning relative to the plants, and a crop conveying device associated with the picking head attachment for receiving and conveying the crop to a storage device. The storage device includes a rotatable drum movable between two angular positions in one of which it receives the crop and in the other of which it discharges the crop.

The crop conveying device is a duct subjected to vacuum such that picked flowers are conveyed from the picking head attachment by suction along the duct to the storage bin which is capable of rotation through approximately 180° from its crop receiving position to its crop discharging position. In the receiving position the bin forms part of the area subjected to vacuum so that crop material conveyed along the vacuum duct falls by gravity into the storage bin.

The periphery of the bin has an open segment which in the crop receiving position is at the top and communicates the bin with the source of vacuum. In the crop discharging position the open segment of the bin is at the bottom so that crop material can fall from the bin. The machine is constructed to straddle the plants to be harvested and the picking head attachment is pivoted at a point remote from the picking head near the rear of the machine.

According to a preferred embodiment of the invention there are provided first and second fluted drums rotatable about axes vertically spaced apart a distance to enable the flutes to engage and harvest mature pyrethrum flowers. The upper fluted drum is substantially twice the diameter of the lower fluted drum thereby resulting in the upper drum's having a peripheral speed twice that of the smaller lower drum. The flutes of the larger drum are spaced circumferentially twice as far apart as those of the smaller drum and engage the flowers to pull them in between the fluted drums to effect removal of the mature flowers.

The faster peripheral speed of the upper drum enables the flutes of the upper and lower drums to apply a rolling or rocking action on a mature flower, similar to hand picking, thereby including a greater strain on one side of the stem at its juncture with the flower bowl. This causes the flower to be severed from its stem in such manner as to minimize the harvesting with the flower of an unwanted stem section.

DESCRIPTION OF THE DRAWINGS

A machine constructed in accordance with the invention is disclosed in the accompanying drawings wherein:

FIG. 2 is an enlarged, fragmentary, diagrammatic view illustrating the picking head and a portion of the crop conveying ducting in more detail;

FIG. 3 is a view of a flower separated from its stem by the application of vertically upward force on the bowl of the flower;

FIG. 4 is a view illustrating a preferred manner of manually picking a flower; and FIG. 5 is a diagrammatic view of the picking of a flower by apparatus according to the invention.

DESCRIPTION OF PREFERRED EMBODIMENT

Figure 1:
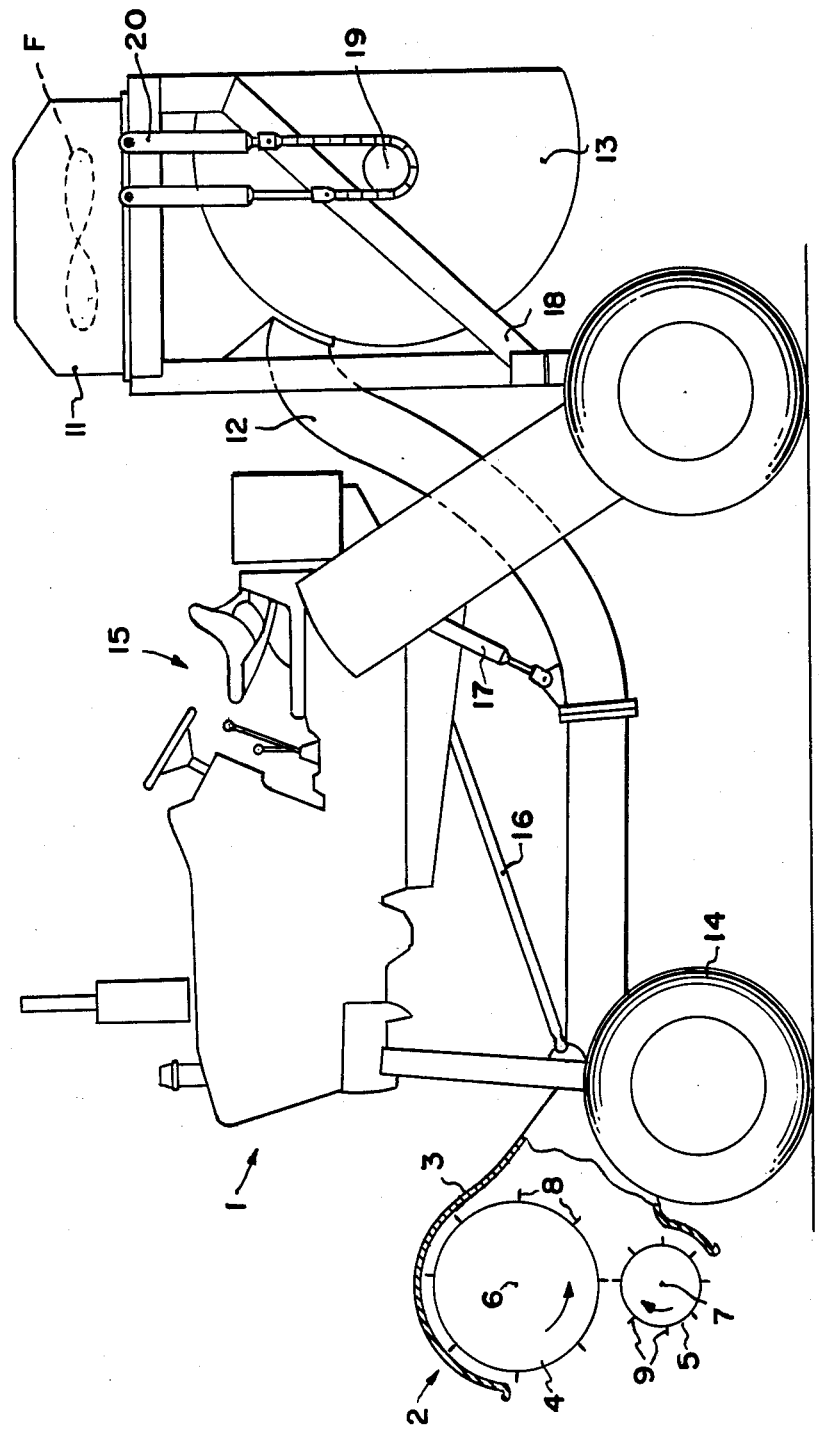
FIG. 1 is a diagrammatic, side elevational view of a tractor equipped with a picking head, storage bin, suction generating means, and crop conveying ducting.

FIG. 1 discloses a mobile tractor chassis 1 on which a picking head 2 is mounted. The head 2 comprises a shroud 3 having top, bottom, and side walls and an opening at its forward end in which is mounted a pair of rotary drums 4 and 5 for rotation about vertically spaced axes 6 and 7, respectively. Any conventional means may be used to rotate the drums in opposite directions as shown by the arrows in FIGS. 1 and 2.

The upper drum 4 is provided with axially elongate, radially extending, circumferentially spaced, rigid flutes 8 and the lower drum 5 is provided with similar flutes 9. The number of flutes on each drum is the same, but the diameter of the upper drum preferably is twice that of the lower drum. The circumferential spacing between the flutes 8 thus is twice that of the flutes 9. The peripheral speed of the drum 4 also is twice that of the drum 5 and the relative positions of the flutes 8 and 9 are such that, during one revolution of each drum, one after another of the flutes 8 will directly and momentarily confront the flutes 9, as is shown in FIGS. 1 and 2. In these positions, a space 10 exists between the confronting flutes.

The vertical positions of the two drums as illustrated is adjustable in a conventional manner so that the space 10 between the flutes can be adjusted to enable the harvesting of flowers of mature size only. Smaller, immature flowers are not harvested, but instead remain on their respective stems for further growth. The spacing between the flutes and the upper and lower walls of the shroud is slight, for a purpose presently to be explained, and in any case there is insufficient clearance between the lower wall of the shroud and the flutes 9 to enable a flower to pass therebetween.

The shroud 2 communicates with a fan housing 11 via ducting 12 to carry picked flowers to a bin 13. A fan F within the housing 11 establishes an air draft in the shroud and ducting which not only conveys picked flowers to the bin 13, but also assists in drawing the flower and associated stem into the correct attitude relative to the flutes. The close clearance between the flutes and the upper and lower walls of the shroud helps to cause the largest quantity of the air draft to pass through the space 10.

The tractor chassis 1 is mounted on wheels 14 with the operator's controls 15 above and adjacent the picking head 2. The tractor is adapted to straddle the plants to be harvested. This form of harvesting is particularly suitable for pyrethrum flower picking.

The picking head 2 is mounted on a pivotal boom 16 for vertical movement under the control of a power cylinder 17. The boom and cylinder preferably are pivoted near the rear of the tractor. The bin 13 is mounted on a frame 18 for rotation about a horizontal axis 19 between crop storage and crop discharge positions. A suitable, known mechanism 20 is provided for rotating the bin between such positions.

The air stream travelling rearwardly through the ducting 25 and carrying picked flowers discharges into the storage bin 13. The trajectory of the ducting is such that the crop and the air current enter the bin near its top along a substantially horizontal path. As the air and crop enter the bin the increase in area of the bin results in a loss of air velocity and impetus so that the harvested crop falls under the influence of gravity into the bottom of the bin. The bin 13 thus forms a part of the air suction path and in its closed position effectively seals the vacuum path formed between the picking head 2 and the housing 11. The fan F is mounted at the upper end of the housing 11 and includes an internal combustion or hydraulic driving motor of conventional construction. The housing has an exhaust opening at its upper end. Between the upper end of the bin and the lower end of the housing 11, and below the fan F, is a screen (not shown) to prevent any possibility that picked flowers will be exhausted with the air stream.

If desired, the picking head may be placed ahead of the tractor's front wheels, as shown, so that a relatively wide path can be harvested forwardly of any wheel damage which may be inflicted on the stems and flowers, thereby avoiding the necessity of growing pyrethrum in beds (which is the traditional method) and allowing broad acre field planting with increased density per acre.

FIG. 3 discloses a typical, mature pyrethrum plant 21 comprising a stem 22, a flower bowl 23, and petals 24. If a vertically upward force is applied to the bottom of the bowl the stem is likely to separate at a point spaced from the bowl, thereby resulting in an unwanted section 25 of stem being harvested along with the flower. However, if the bowl 23 is rocked about its juncture with the stem 22, as usually occurs in the manual picking technique, the bowl separates cleanly from the stem as is shown in FIG. 4.

The manual picking technique is simulated with apparatus according to the invention, as is illustrated in FIG. 5. The radial lengths of the flutes 8 and 9 are such that only slightly more clearance than the stem thickness exists between them and the upper and lower walls of the shroud, thereby enhancing the flow of air through the space between the drums. As has been indicated earlier, the flow of air into the leading end of the shroud 3, coupled with rearward movement of the flutes 8 at the lower part of the upper drum 4, causes the upper ends of the flower stems to be inclined in a direction opposite that in which the tractor moves along its path. This enables the stem 22 of a flower to be accommodated between the upper and lower flutes 8 and 9, respectively. Although the upper and lower flutes of each drum successively and directly confront one another momentarily as they move through a vertical plane passing through the axes 6 and 7, the peripheral speed of the upper flute is greater than that of the lower flute. If a flower attached to the stem is mature, the bowl 23 will be of such thickness as to be engaged by the upper flute 8 and rocked about its juncture with the stem 22, as is shown in FIG. 5, thereby effecting clean separation of the bowl from the stem at the juncture thereof.

If the flower is immature, however, the thickness of the bowl 23 will be smaller and it therefore will not be possible for the rocking action referred to above to be imparted to the bowl. Accordingly, the immature flower will not be severed from its stem, but will remain thereon in condition for further growth. The drums 4 and 5 are vertically adjustable relative to one another by conventional means so as to adjust the spacing between confronting flutes 8 and 9.

Flowers which are severed from their stems will be conveyed along the ducting 12 to the bin 13. Air is exhausted through an opening at the upper end of the bin, whereas the flowers fall toward the bottom of the bin. Once the bin is full, it may be rocked about the axis 19 to a position in which the collected flowers are discharged.

I claim:

1. A machine for use in harvesting flowers growing in a field, each of said flowers having a bowl supported above ground level by an upstanding stem, said machine comprising a mobile chassis movable in a selected direction along a path through said field; first and second rotary picking drums having a gap therebetween and rotatable in opposite directions at different peripheral speeds about vertically spaced axes; and a plurality of circumferentially spaced, axially extending, radially projecting flutes carried by each of said drums, the directions of rotation of said drums being such that the flutes traversing said gap move in a direction opposite that of said chassis, the circumferential spacing of the flutes of the respective drums and the relative peripheral speeds of said flutes being such that in said gap the flutes of one of said drums successively confront the flutes of the other of said drums, the spacing between said axes and the relative radial lengths of the flutes of the respective drums being such that a space exists between confronting flutes in said gap, said space being less than the thickness of the bowl of a mature flower but greater than the thickness of the bowl of an immature flower, the difference in peripheral speeds between said drums enabling a mature flower bowl engaged by two flutes on the drums to be rocked and severed from its stem.

2. A machine according to claim 1 wherein said flutes are rigid.

3. A machine according to claim 1 wherein the diameters of said drums are different.

4. A machine according to claim 1 wherein the diameter of the upper drum is greater than that of the lower drum.

5. A machine according to claim 4 wherein the diameter of the upper drum is twice that of the lower drum.

6. A machine according to claim 5 wherein each of said drums has the same number of flutes.

7. A machine according to claim 1 wherein each of said drums has the same number of flutes.

8. A machine according to claim 1 wherein said flutes are formed by circumferentially spaced, alternating lands and grooves.

9. A machine according to claim 1 wherein said drums are accommodated within an opening at one end of a shroud having top, bottom, and side walls, and fan means in communication with said shroud for generating an air stream through said shroud from said opening towards its other end to convey separated blooms in a direction away from said drums.

10. A machine according to claim 9 wherein said upper and lower walls of said shroud are spaced from the flutes of said drums a distance sufficient to provide slight clearance for said flutes.

11. A machine according to claim 9 wherein said lower wall is spaced from said lower drum a distance sufficient to provide clearance between said lower wall and the flutes on said lower drum, but insufficient to provide clearance for a flower carried by a flute on said lower drum.

* * * * *